United States Patent
Guy

(10) Patent No.: US 7,890,596 B2
(45) Date of Patent: Feb. 15, 2011

(54) TRIAGE OF ELECTRONIC MAIL

(75) Inventor: Ido Guy, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 12/141,113

(22) Filed: Jun. 18, 2008

(65) Prior Publication Data

US 2009/0319614 A1 Dec. 24, 2009

(51) Int. Cl.
G06F 15/16 (2006.01)
(52) U.S. Cl. .................. 709/207; 709/206; 709/200
(58) Field of Classification Search .............. 709/204, 709/206, 207, 200
See application file for complete search history.

(56) References Cited

U.S. PATENT DOCUMENTS

| | | | |
|---|---|---|---|
| 6,925,605 B2 | 8/2005 | Bates et al. | |
| 7,065,550 B2 * | 6/2006 | Raghunandan | 709/203 |
| 2005/0204001 A1 * | 9/2005 | Stein et al. | 709/206 |
| 2005/0267944 A1 * | 12/2005 | Little | 709/207 |
| 2006/0010217 A1 * | 1/2006 | Sood | 709/206 |
| 2006/0195533 A1 * | 8/2006 | Isozaki et al. | 709/206 |
| 2007/0203991 A1 * | 8/2007 | Fisher et al. | 709/206 |
| 2008/0005249 A1 * | 1/2008 | Hart | 709/206 |
| 2008/0028031 A1 * | 1/2008 | Bailey et al. | 709/207 |
| 2009/0113016 A1 * | 4/2009 | Sen et al. | 709/207 |
| 2009/0265433 A1 * | 10/2009 | Wu | 709/206 |
| 2010/0017404 A1 * | 1/2010 | Banerjee et al. | 707/6 |
| 2010/0017475 A1 * | 1/2010 | Colson et al. | 709/206 |
| 2010/0030798 A1 * | 2/2010 | Kumar et al. | 707/102 |
| 2010/0036813 A1 * | 2/2010 | Cameron et al. | 707/3 |

FOREIGN PATENT DOCUMENTS

CN 1312509 A 9/2001

OTHER PUBLICATIONS

Laura A. Dabbish et al., "Understanding email predicting action on a message", CHI 2005: Technology, Safety, Community: Conference Proceedings—Conference on Human Factors in Computing Systems, CHI 2005: Technology, Safety, Community: Conference Proceedings—Conference on Human Factors in Computing Systems, 2005, p. 691-700.*

* cited by examiner

*Primary Examiner*—Nathan Flynn
*Assistant Examiner*—Aftab Nasir Khan

(57) ABSTRACT

A method for processing electronic mail messages (emails), including receiving a first batch of the emails, and displaying a first listing of the first batch to a recipient of the emails for selection by the recipient for viewing. The method further includes recording an order of the selection by the recipient of the emails from the first listing, and receiving a second batch of the emails subsequent to the first batch. The method also includes formulating and displaying to the recipient a second listing of the second batch responsively to the order of the selection from the first listing.

21 Claims, 8 Drawing Sheets

FIG. 5

| Identity (ID) | Time/Date | Attachment | Priority | Sender | Subject | Account | Order Viewed |
|---|---|---|---|---|---|---|---|
| : | : | : | : | : | : | : | |
| 9 | 3/1/2008 01:33 | N | M | I. India | UIPOWWW | A1 | |
| 10 | 3/1/2008 01:41 | N | M | J. Juliet | RTYWQE | A1 | |
| 15 | 3/1/2008 02:31 | N | M | D. Delta | 1111AAAA | A2 | 1 |
| 18 | 3/1/2008 03:31 | N | H | G. Golf | 00001234 | A3 | 2 |
| 22 | 3/1/2008 04:04 | N | M | J. Juliet | RTYWQE | A1 | 3 |
| 11 | 3/1/2008 02:10 | Y | H | A. Alfa | AAABBB | A1 | 4 |
| 20 | 3/1/2008 04:01 | N | L | H. Hotel | | | 6 |
| 13 | 3/1/2008 02:21 | N | M | C. Charlie | QQQQAAA | A1 | 8 |
| 21 | 3/1/2008 04:02 | N | M | I. India | UIPOWWW | A1 | 9 |
| 12 | 3/1/2008 02:20 | N | M | K. Kilo | HEHEHEHE | A2 | 5 |
| 14 | 3/1/2008 02:30 | N | H | L. Lima | GGGGAAA | A1 | 10 |
| 16 | 3/1/2008 02:41 | N | M | M. Mike | NBNBNBN | A1 | 11 |
| 17 | 3/1/2008 03:02 | Y | M | N. November | JJJJKKKKK | A2 | 7 |
| 19 | 3/1/2008 03:50 | N | M | O. Oscar | REEEETTTT | A1 | 12 |
| 23 | 3/1/2008 04:20 | N | H | P. Papa | AAAAAAWW | A1 | 13 |
| | PREVIEW | | | | | | |
| | Joe: Received your order. Thanks. | | | | | | |

| Characterizing Parameter: Sender | Order |
|---|---|
| D. Delta | 1 |
| G. Golf | 2 |
| J. Juliet | 3 |
| A. Alfa | 4 |
| K. Kilo | 5 |
| H. Hotel | 6 |
| N. November | 7 |
| C. Charlie | 8 |
| I. India | 9 |
| L. Lima | 10 |
| M. Mike | 11 |
| O. Oscar | 12 |
| P. Papa | 13 |

Opportunity Matrix

|  | | Sender | | | | | |
|---|---|---|---|---|---|---|---|
| | | A | B | C | D | E | F |
| Sender | A | x | 0 | 10 | 6 | 5 | 3 |
| | B | 0 | x | 5 | 3 | 8 | 7 |
| | C | 10 | 5 | x | 9 | 7 | 3 |
| | D | 6 | 3 | 9 | x | 2 | 0 |
| | E | 5 | 8 | 7 | 2 | x | 5 |
| | F | 3 | 7 | 3 | 0 | 5 | x |

150, 152, 154

Event Matrix

|  | | Second Sender | | | | | |
|---|---|---|---|---|---|---|---|
| | | A | B | C | D | E | F |
| First Sender | A | x | 0 | 0 | 5 | 5 | 0 |
| | B | 0 | x | 5 | 3 | 6 | 7 |
| | C | 10 | 0 | x | 7 | 6 | 0 |
| | D | 1 | 0 | 2 | x | 2 | 0 |
| | E | 0 | 2 | 1 | 0 | x | 0 |
| | F | 3 | 0 | 3 | 0 | 5 | x |

160, 162, 164

Metric Matrix

| | A | B | C | D | E | F | Metric |
|---|---|---|---|---|---|---|---|
| A | x | - | 0 | 0.83 | 1 | 0 | 1.83 |
| B | - | x | 1 | 1 | 0.25 | 1 | 3.25 |
| C | 1 | 0 | x | 0.78 | 0.86 | 0 | 2.64 |
| D | 0.17 | 0 | 0.22 | x | 1 | - | 1.39 |
| E | 0 | 0.25 | 0.14 | 0 | x | 0 | 0.39 |
| F | 1 | 0 | 1 | 0 | 1 | x | 3 |

170

| Sender | Order |
|---|---|
| B | 1 |
| F | 2 |
| C | 3 |
| A | 4 |
| D | 5 |
| E | 6 |

28C

FIG. 8

TRIAGE OF ELECTRONIC MAIL

FIELD OF THE INVENTION

The present invention relates generally to electronic mail messages (emails), and specifically to prioritizing emails.

BACKGROUND OF THE INVENTION

As electronic mail message (email) usage becomes more ubiquitous, the problem generated by the volume of email received by each user increases. The problem is compounded by the ease with which not only a particular email is sent to a specific addressee, but also the relative ease with which copies of the email may be sent as "carbon copies" (cc) to other receivers. In addition, emails may not only be sent and received from a computer, but may be sent and received from other equipment such as some personal digital assistants (PDAs).

The volume of email sent is huge. In the United Kingdom alone, for instance, it is estimated that in the early part of 2008 almost three billion emails were sent every day, averaging approximately 50 for every single inhabitant of the country. Similar rates are probably true for other countries.

Consequently, any system which improves the efficiency of email delivery would be advantageous.

SUMMARY OF THE INVENTION

Some embodiments of the present invention provide a method, a computer software product, and apparatus for processing electronic mail messages (emails). The processing of the emails includes receiving a first batch of the emails, and displaying a first listing of the first batch to a recipient of the emails for selection by the recipient for viewing. The processing also includes recording an order of the selection by the recipient of the emails from the first listing.

A second batch of the emails subsequent to the first batch is received, and the processing includes formulating and displaying to the recipient a second listing of the second batch responsively to the order of the selection from the first listing.

The present invention will be more fully understood from the following detailed description of the embodiments thereof, taken together with the drawings, in which:

BRIEF DESCRIPTION OF THE DRAWINGS

FIG. 5 shows an exemplary listing of a subsequent batch of emails presented to the recipient, according to an embodiment of the present invention;

FIG. 8 depicts matrices that are used by a processing unit in implementing the flowchart of FIG. 7, according to the alternative embodiment of the present invention.

DETAILED DESCRIPTION OF EMBODIMENTS

Overview

In embodiments of the present invention, a batch of emails (electronic mail messages) is received, and a listing of the batch is displayed to a recipient of the emails. The order in which the recipient selects the emails for viewing is recorded. The order of selection is assumed to correspond to an importance level which the recipient assigns to the different emails in the batch. The order of selection is applied to a subsequent received batch of emails, so that in a listing of the subsequent batch presented to the recipient, emails having the highest importance may be listed before those having lower importance. Typically, the importance level is measured with respect to one or more parameters that are characteristic of the emails. Usually, although not necessarily, the parameter is the sender of the email, in that the recipient deems certain senders to be more important than other senders. For example, assume that in an earlier batch of emails the recipient opens an email from sender A before an email from sender B. The recipient then receives a subsequent email batch including emails from sender A and sender B. In this case the listing presented to the recipient lists the email from sender A before the email from sender B.

As more batches are received and opened by the recipient, the importance level is typically updated on an iterative basis. Applying the importance level to presenting listings of incoming batches of emails provides an efficient system for triage of emails.

System Description

Figure 1:
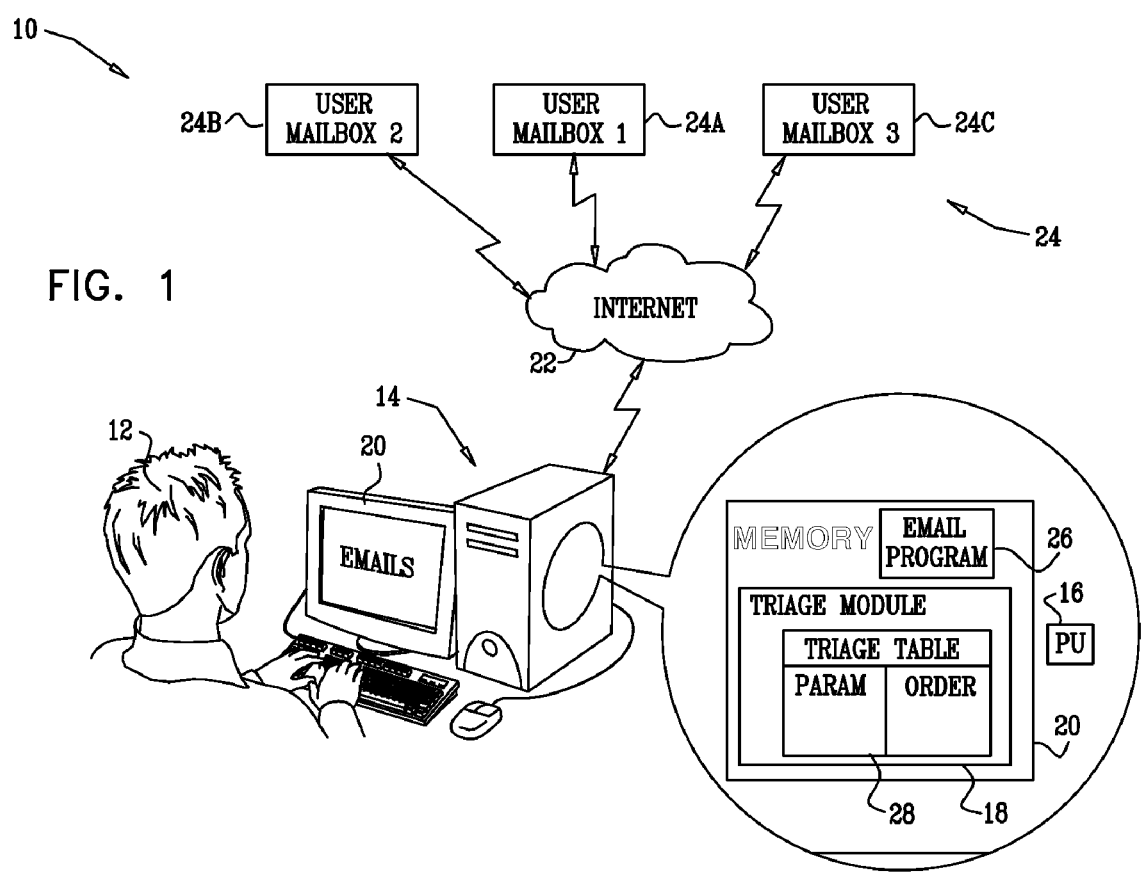
FIG. 1 is a schematic diagram of an electronic mail message (email) triage system, according to an embodiment of the present invention.

Reference is now made to FIG. 1, which is a schematic diagram of an electronic mail message (email) triage system 10, according to an embodiment of the present invention. System 10 is operated by a user 12, herein also referred to as recipient 12, who typically receives and reads or views emails on a computer station 14. However, the operation of system 10 is not limited to operation on one computer station, and the triage system described herein may be operated via substantially any number of different email receivers.

Station 14 comprises a processing unit 16, which may be a localized processing unit and/or a distributed processing unit. Processing unit 16 accesses a memory 18, which is typically a combination of volatile and non-volatile memory elements. Hereinbelow, by way of example, it is assumed that an email program 26, configured to send and receive emails, is installed in memory 18. Such email programs, such as Outlook Express® by Microsoft Corporation of Redmond, Wash., are typically proprietary, and are operated by PU 16. A triage module 20 is installed in memory 18, and the processing unit accesses the module to operate system 10, the operation of the module modifying the behavior of program 26. Triage module 20 comprises a triage table 28 that is a correspondence between a characterizing email parameter and an importance level attached to the parameter by recipient 12. The importance level may be considered to be generally similar to a ranking or order of importance attached by the recipient to email senders comprised in a social network of the recipient. In the description herein, triage tables having different values are distinguished from each other by a letter suffix, i.e., triage table 28A, triage table 28B, . . . . The functions of the triage module and the triage table are described in more detail below.

As is described in more detail below, triage module 20, and thus system 10, may be embodied as a system, method or computer program product that is implemented in hardware, software, or a combination of hardware and software. Furthermore, module 20 and system 10 may be embodied as a system, method or computer program product that PU 16 may operate substantially independently of any given email program such as program 26. Thus, while the description below assumes that in system 10 triage module 20 modifies the behavior of program 26, those having ordinary skill in the art will be able to adapt the description, mutatis mutandis, for a system that is substantially independent of any given email program.

Station 14 is coupled to a network 22, such as the Internet. By way of example, recipient 12 is assumed to have three email accounts, although in practice a recipient may have any number of accounts. Emails addressed to recipient 12 are stored in email recipient mailboxes 24A, 24B, 24C that are provided for the use of the recipient when the recipient opens a corresponding email account, and each mailbox has a different email address for the recipient. Mailboxes 24A, 24B, and 24C are collectively referred to herein as mailboxes 24, and mailboxes 24 are also coupled to network 22. To check for emails addressed to the account of recipient 12, the recipient accesses, typically substantially simultaneously, mailboxes 24 from station 14, and the mailboxes provide their received emails to the station. Typically, once the emails have been provided to station 14, no copies of the emails are retained in the mailboxes, but the emails may be stored in memory 18. In some embodiments email copies may be retained in one or more mailboxes 24.

Station 14 comprises a display 20, upon which, as described below, processing unit 16 displays a listing of emails received from mailboxes 24, according to instructions provided to the processing unit by the recipient. An example of such a listing that is presented to recipient 12 is illustrated in FIG. 2.

Figure 2:
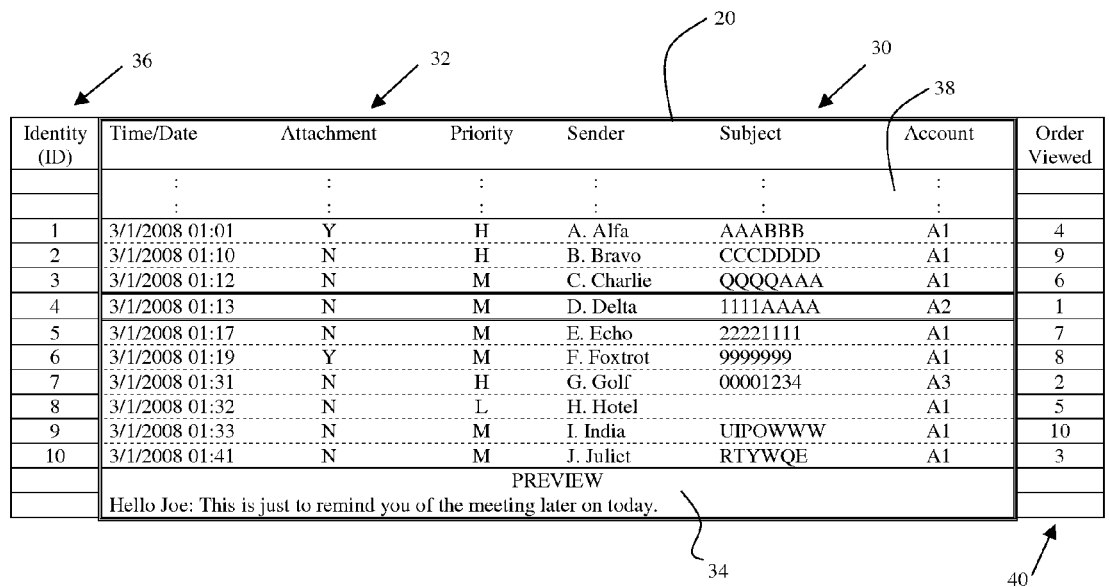
FIG. 2 shows an exemplary listing of a batch of emails presented to a recipient, according to an embodiment of the present invention.

FIG. 2 shows an exemplary listing 30 of a batch of emails presented to recipient 12 on display 20, according to an embodiment of the present invention. By way of example, it is assumed that the batch of emails is presented on the display in a sequence that is determined according to the time of arrival of the emails at their respective mailboxes, with the later emails being lowest in the listing.

Emails have a number of parameters that characterize the emails. Table I below gives names of some parameters that may be used for such characterization, and a brief description of the parameter.

TABLE I

| Characterizing Parameter Name | Description |
| --- | --- |
| Time/Date | A timestamp, giving the date and time at which the email was received at its mailbox. |
| Attachment | Indicates if the email has a file attached (Y), or has no attachment (N). |
| Priority | A sender may assign a priority to the email. Typical parameters are high (H), medium (M), or low (L). |
| Sender | A "name" of the sender. This may comprise a "regular" name, such as Jane Doe. In general, the name may comprise any string of alphanumeric characters generated by the sender. Such a string is intended to |

TABLE I-continued

| Characterizing Parameter Name | Description |
| --- | --- |
| | provide recipient 12 with information as to the identity of the sender. |
| Subject | An alphanumeric string provided by the sender. The subject is intended to provide recipient 12 with information as to the content of the email. |
| Account | The name of the account via which recipient 12 accesses the email. For each account there is a mailbox. |

Other parameters, such as a size of the email and a content of the email, may characterize the email. All such parameters will be apparent to one having ordinary skill in the art.

Listing 30 shows a batch of emails received at station 14, and the listing on its top line shows parameters 32 exemplified in Table I. Typically, recipient 12 sets the parameters that are to be displayed in listings of batches of emails, such as listing 30. In addition to the characterizing parameters described above, each email received at station 14 is typically assigned an internally unique email identity (ID) by PU 16. Herein, by way of example, PU 16 is assumed to assign the ID of an email sequentially, according to the time of arrival of the email at its mailbox, i.e., according to the timestamp of the email. Illustrative IDs 36 for each of the listed emails are shown in FIG. 2. However, typically such IDs are not displayed to recipient 12. In the description herein, emails are differentiated by their IDs, and the notation email(N) is used for an email having an ID number N.

Thus, as shown in FIG. 2, list 30 comprises a batch of emails having parameters 32 and unique IDs 36. In some embodiments, recipient 12 is able to select an email from the batch, such as the email from D. Delta, and email program 26 displays a preview 34 of the contents of the selected email, without the recipient having to open the email.

Typically, in addition to listing 30, at least some emails that recipient 12 has received in previous sessions of operation of station 14 may be displayed in a region 38 of display 20. Such emails are not included in the batch of emails of listing 30.

Figure 3:
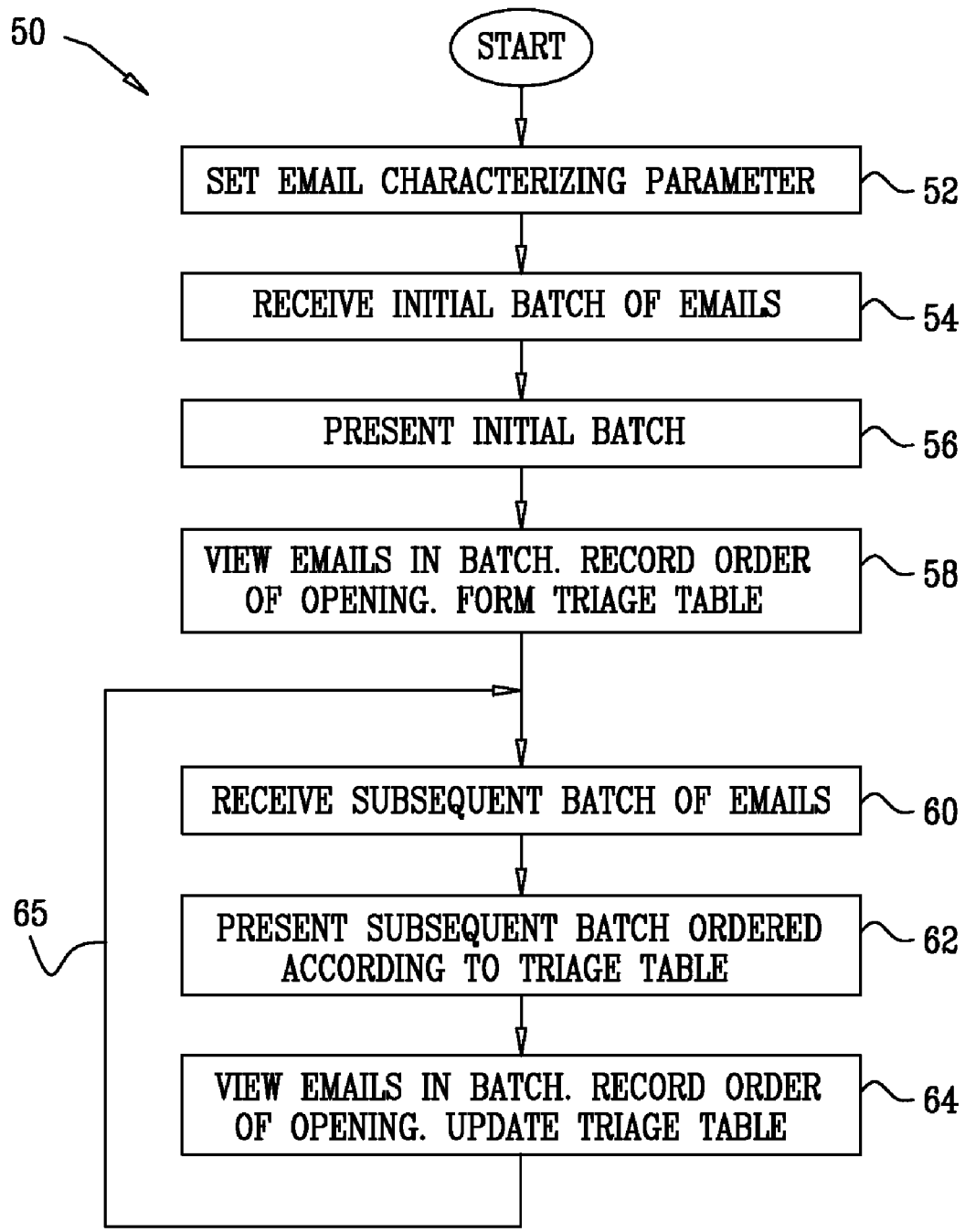
FIG. 3 is a flowchart showing steps performed by a processing unit in implementing the system of FIG. 1, according to an embodiment of the present invention.
Figure 4:
FIG. 4 is a table generated on implementation of the flowchart of FIG. 3, according to an embodiment of the present invention.

FIG. 3 is a flowchart 50, showing steps performed by processing unit 16 in implementing system 10, and FIG. 4 is a table generated on implementation of the flowchart, according to embodiments of the present invention.

In a parameter setting step 52, recipient 12 sets a characterizing parameter 32 (FIG. 2) that is to be tracked by PU 16. Except as described hereinbelow, the parameter tracked is assumed to be the sender of the email.

In an initial batch receiving step 54, recipient 12 operates station 14 at an initial time to access an initial batch of emails. PU 16 accesses mailboxes 24 and receives the emails from the mailboxes.

In a display initial batch step 56, a summary of the received emails is displayed as a listing of the emails on display 20, and is assumed to be displayed by PU 16 substantially as shown in listing 30 (FIG. 2). Listing 30 is displayed in a sequence according to the times the emails of the listing were received at their respective mailboxes.

In a view initial batch step 58, recipient 12 views the emails in the displayed listing, and PU 16 records the order in which the recipient views the emails. Recipient 12 may view the emails by opening them and/or by selecting the emails to be viewed in a preview region such as preview 34. Returning to FIG. 2, an exemplary order by which recipient 12 views the emails is shown in column 40. Of the 10 emails in the initial batch, recipient 12 views email(4) first, and email(9) last.

The order by which recipient 12 views the emails of the batch is used to formulate triage table 28. The table is a correspondence between the characterizing parameter set in step 52 and the order in which an email having the characterizing parameter is viewed. Triage table 28A, generated by viewing listing 30 of emails according to the order of column 40 (FIG. 2), is shown in FIG. 4.

In a subsequent batch receiving step 60, recipient 12 operates station 14 to access a subsequent batch of emails. The recipient may operate station 14 at substantially any time after the initial time. Typically the time period between the two accesses is chosen to be convenient to recipient 12. Depending on the volume of emails the recipient typically receives, the time period may be of the order of hours, but could be less or more than this. As for step 54, PU 16 accesses mailboxes 24 and receives the emails that are in the mailboxes.

In a display subsequent batch step 62, PU 16 accesses triage table 28. PU 16 uses the correlation of the table to determine the sequence in which the subsequent batch of emails is summarized and presented to recipient 12 on display 20. The determination is explained in more detail below, with reference to FIG. 5, which shows a typical presentation of the subsequent batch.

Figure 6:
FIG. 6 is a table generated from the listing of FIG. 5, according to an embodiment of the present invention.

FIG. 5 shows an exemplary listing 80 of the subsequent batch of emails presented to recipient 12 on display 20, and FIG. 6 is a table generated from the listing, according to embodiments of the present invention. Apart from the differences described below, listing 80 is generally similar to listing 30 (FIG. 2), and elements indicated by the same reference numerals in both listings are generally similar.

By way of example, the subsequent batch of emails is assumed to comprise 13 emails, having IDs 11-23 which are assigned, as stated above, according to their respective mailbox times of arrival. The 13 emails are assumed to include some emails from the same senders as the senders of the initial batch of emails: A. Alfa, C. Charlie, D. Delta, G. Golf, H. Hotel, I. India, and J. Juliet.

In contrast to the email listing in FIG. 2, which is according to the times of arrival of the emails, listing 80 is sequenced according to triage table 28A. Returning to step 62 (FIG. 3), the characterizing parameter of each email in the subsequent batch is determined, and checked to see if the parameter is in triage table 28. If it is in the table, then, when the listing of the batch is presented on display 20, the emails having characterizing parameters given in the triage table are listed first, in the sequence given by the table. Emails 82 correspond to these emails, and it will be observed that emails 82 are not presented in their time/date order. When all of the emails in the batch corresponding to emails 82 have been listed, the remaining emails, corresponding to emails 84, are listed on display 20. Emails 84 are typically listed according to their time/date order.

The presentation on display 20 of emails 82 and 84, as listing 80, is typically performed substantially simultaneously.

Returning to flowchart 50 (FIG. 3), after the subsequent batch of emails has been presented as listing 80, in a view subsequent batch step 64, recipient 12 views the subsequent batch of emails. PU 16 records the order of viewing, as shown in column 86 of FIG. 5, and updates triage table 28.

In a disclosed embodiment of the present invention, triage table 28 may be updated using only the order of viewing for the subsequent batch of emails. FIG. 6 shows as table 28B the updated triage table 28 generated according to the email openings of column 86. In the disclosed embodiment, steps 60, 62, and 64 may be performed iteratively, for further batches of emails received by recipient 12, so that the order of senders in triage table 28 only reflects the order of viewing of one previous batch of emails. The iteration is illustrated by a broken line 65.

It will be understood that flowchart 50 is applicable for initial batches of emails received by recipient 12, wherein there is little or no history of email viewing that may be used to generate triage table 28. An embodiment of the present invention that uses accumulated data of viewing of batches of emails is described below.

Figure 7:
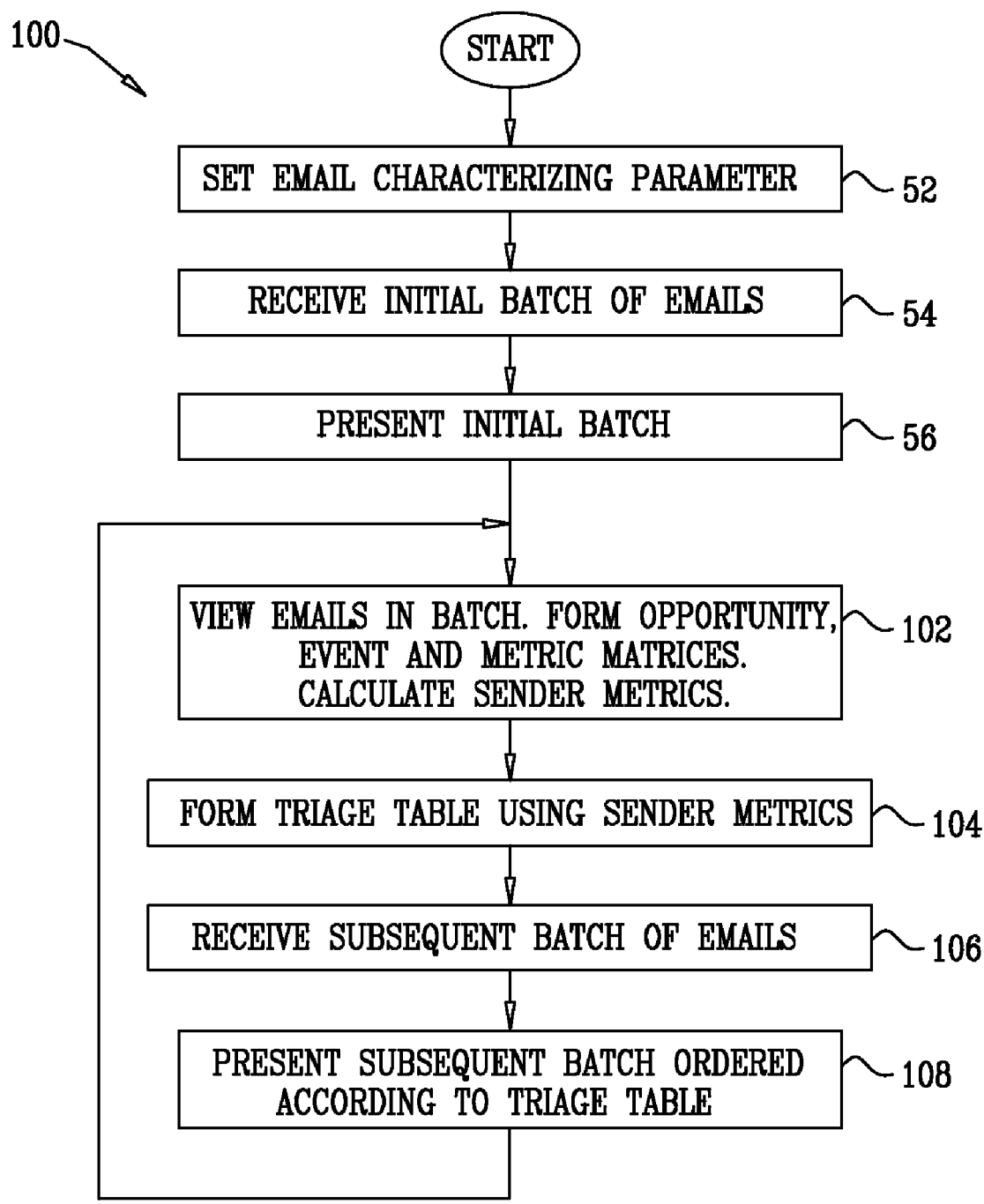
FIG. 7 is a flowchart showing steps performed in generating a triage table, according to an alternative embodiment of the present invention.

FIG. 7 is a flowchart 100, showing steps performed in generating triage table 28, and FIG. 8 depicts matrices that are used by PU 16 in implementing the flowchart, according to alternative embodiments of the present invention. The description above, with regard to flowchart 50, comprises one method for generating table 28. The description below comprises an alternative method for generating the table, using data accumulated by PU 16 as recipient 12 views successive batches of emails. Flowchart 100 uses a number of steps similar to flowchart 50, and steps indicated by the same reference numerals in both flowcharts are generally similar in implementation.

In the following description, it is assumed that recipient 12 receives and views ten batches of emails. Each batch of emails contains between 2 and 6 emails. Each batch has emails from different senders, herein called A, B, C, D, E, and F. The values shown in the matrices of FIG. 8 are exemplary values that are assumed to be incorporated into the matrices by PU 16 after recipient 12 has viewed the ten batches of emails.

In FIG. 8 an opportunity matrix 150, also termed matrix OM, lists every email sender in its columns, and also every email sender in its rows. A cell in matrix OM has a value $OM_{ij}$, where i is the row number of the matrix, and j is the column number. Each cell of the opportunity matrix shows the number of times the row sender and the column sender occur in a given batch of emails presented to recipient 12. For example, cell 152 and cell 154 show that in the ten batches of emails viewed, emails from sender B and sender E co-occurred in 8 of the batches. Matrix 150 is symmetric, so that for all i,j, $OM_{ij}=OM_{ji}$, and for the example given above $OM_{25}=OM_{52}=8$.

An event matrix 160, also termed matrix EM, lists every sender as a first sender for its rows, and every sender as a second sender for its columns. Using similar notation to that for the opportunity matrix, each cell in matrix EM has a value $EM_{ij}$. Each cell of the event matrix shows the number of times email from the first sender is selected to be viewed before email from the second sender. Matrix 160 is not symmetric. For example, cell 162 shows that for the ten batches viewed, the recipient viewed email from sender B 6 times before viewing email from sender E, and $EM_{25}=6$. Cell 164 shows that recipient 12 viewed email from sender E 2 times before viewing email from sender E, and $EM_{52}=2$. It will be appreciated that the sum of the values in cells 162 and 164 is the value in cell 152 or cell 154, and that in general expression (1) holds:

$$EM_{ij}+EM_{ji}=OM_{ij} \quad (1)$$

A metric matrix 170, also termed matrix MM, is derived from the opportunity matrix and the event matrix. Matrix MM has rows and columns corresponding to those of the opportunity and event matrices. The value of each cell of the metric matrix is calculated according to expression (2):

$$MM_{ij} = \frac{EM_{ij}}{OM_{ij}} \qquad (2)$$

A metric for each characterizing parameter i is derived from the cell values of matrix MM, according to expression (3):

$$Metric_i = \sum_j MM_{ij} \qquad (3)$$

In regard to flowchart 100, steps 52, 54, and 56 are typically substantially as described above for flowchart 50. The remaining steps of flowchart 100 are performed iteratively.

In a view email step 102, recipient 12 views the emails presented on display 20. PU 16 tracks the order in which the emails are viewed, and completes matrices 150, 152, and 154 accordingly. From metric matrix 154, PU 16 calculates order metrics $Metric_i$, where i corresponds to senders A, B, C, D, E, and F, according to expression (3).

In a formulate triage table step 104, PU 16 forms triage table 28 using the calculated metrics from step 102. The highest value metric corresponds to the sender having the highest order in the table.

In cases where the metrics are equal, as may typically be the case after low numbers of iterations of the flowchart, PU 16 arbitrates between senders. PU 16 performs the arbitration by determining which senders have equal metrics, and for those senders PU 16 uses the order tracked in the immediately preceding step 102 in forming table 28.

In a subsequent receive email step 106, recipient 12 receives another batch of emails.

In a present subsequent batch step 108, PU 16 determines those emails in the subsequent batch having senders corresponding to those in triage table 28. These emails are presented on display 20 in the order given by the triage table. Emails having senders that are not in table 28 are typically presented according to their respective mailbox timestamps, and as the iterations of flowchart 100 continue, such email senders will be listed in triage table 28, together with an order, as described in step 104.

After step 108, the flowchart returns to step 102 for a further iteration.

Triage table 28C shows the order of senders A, B, C, D, E, and F, that is given by the sender metrics derived from expression (3). The table gives the order after flowchart 100 has iterated so that the ten batches of emails have been opened by recipient 12.

The description above has typically assumed that the email sender is the characterizing parameter used to generate triage table 28. However, it will be appreciated that any other email characterizing parameter, or combination of such parameters, may be used. For flowcharts 50 and 100, the implementation of a different characterizing parameter or combination is performed in step 52. For example, the characterizing parameter may be set as accounts, in which case PU 16 generates numbers for triage table 28 according to the order recipient 12 views emails received from different accounts. Alternatively, the characterizing parameter may be set as a combination of email sender and account, so that, triage table 28 is ordered by the account, and by the sender within each account. Typically, if a combination of parameters is used, the parameters are prioritized in step 52. Thus, in the example above, the account is set as a primary parameter, and the sender as a secondary parameter.

The description above has also assumed that PU 16 tracks emails that recipient 12 views. However, there are other actions that recipient 12 may take on being presented with a listing of emails. For example, recipient 12 may choose to ignore an email in the listing, or to delete the email listed in the summary without viewing it. Such actions may be tracked by PU 16 and the processing unit may factor the actions into the measurements recorded as each particular batch of emails is dealt with by recipient 12. For example, in flowchart 100, the metric $Metric_i$ for any given sender may be reduced by a preset figure, such as 10%, if an email from the sender is ignored by the recipient, or may be reduced by another preset figure, typically a larger one such as 20%, if an email from the sender is deleted without viewing. Alternative methods for handling other possible actions of a recipient on being presented with a listing of emails will be apparent to those having ordinary skill in the art, and all such methods are included in the scope of the present invention.

Some embodiments of the present invention may incorporate a decay factor into the metric for a given sender. For example, if in a set of N batches, a given sender "i" has not sent an email to recipient 12, the metric $Metric_i$ may be reduced by a preset factor, for example 10%, and such a reduction may be applied for succeeding sets of N batches where the given sender is not present. Other types of suitable decay factors that may be applied to the metric for a given sender, and thus to the order allocated to the sender in triage table 28 and in which emails from the given sender are presented in listings of email batches, will be apparent to those having ordinary skill in the art. All such decay factors are assumed to be included within the scope of the present invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or diagrams of methods, apparatus (systems) and computer program products according to embodiments of the invention. It will be understood that each block of the flowchart illustrations and/or diagrams, and combinations of blocks in the flowchart illustrations and/or diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowcharts and/or diagram block or blocks.

The flowcharts and diagrams in the figures illustrate the architecture, functionality, and operation of possible implementations of systems, methods and computer program products according to various embodiments of the present invention. In this regard, each block in the flowcharts or diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flowchart illustrations, and combinations of blocks in the diagrams and/or flowchart illustrations, can be implemented by special purpose hardware-based systems that perform the specified functions or acts, or combinations of special purpose hardware and computer instructions.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

I claim:

1. A method for processing electronic mail messages (emails), comprising:
   receiving a first batch comprising three or more of the emails;
   displaying a first listing of the first batch to a recipient of the emails for selection by the recipient for viewing;
   formulating a correspondence between a respective characterizing parameter of the three or more emails and respective different numbers indicative of an order of the selection by the recipient of the three or more emails;
   receiving a second batch of the emails subsequent to the first batch;
   formulating and displaying to the recipient a second listing of the second batch responsively to the correspondence.

2. The method according to claim 1, wherein the respective characterizing parameter comprises a respective sender of the three or more emails.

3. The method according to claim 1, wherein the respective characterizing parameter is selected from a group of characterizing parameters comprising timestamps, attachments, priorities, subjects, sizes, accounts, and contents of the emails.

4. The method according to claim 1, wherein the first batch of the three or more emails comprises an initial batch of the three or more emails, and wherein displaying the first listing comprises displaying the initial batch in a chronological order.

5. The method according to claim 1, and comprising:
   receiving respective subsequent batches of the emails after the second batch;
   recording subsequent orders of selection by the recipient of the emails from the second batch and from the respective subsequent batches; and
   formulating and displaying to the recipient respective listings of the respective subsequent batches responsively to the subsequent orders of selection.

6. The method according to claim 5, wherein recording the subsequent orders of selection comprises:
   recording respective co-occurrences of first emails having a first characterizing parameter and second emails having a second characterizing parameter in the first batch, the second batch and the subsequent batches of the emails; and
   recording a number of times the first emails are selected for viewing before the second emails are selected for viewing.

7. The method according to claim 6, wherein the first characterizing parameter comprises a first sender of the first emails and wherein the second characterizing parameter comprises a second sender of the second emails.

8. The method according to claim 6, and comprising generating a first order metric for the first characterizing parameter and a second order metric for the second characterizing parameter in response to the respective co-occurrences and the number of times, and wherein displaying the respective listings comprises displaying emails of the respective listings responsively to the first and the second order metrics.

9. The method according to claim 8, wherein generating the first order metric comprises generating the first order metric in response to an action of the recipient comprising at least one of ignoring at least one of the first emails and deleting at least one of the first emails.

10. The method according to claim 8, wherein generating the first order metric comprises determining, from the first batch, the second batch, and the subsequent batches, a number of batches having the first emails absent and applying a decay factor to the first order metric in response to the number of batches.

11. A computer software product for processing electronic mail messages (emails), the product comprising a non-transitory computer-readable medium having computer program instructions recorded therein, which instructions, when read by a computer, cause the computer to:
receive a first batch comprising three or more of the emails;
display a first listing of the first batch to a recipient of the emails for selection by the recipient for viewing;
formulate a correspondence between a respective characterizing parameter of the three or more emails and respective different numbers indicative of an order of the selection by the recipient of the three or more emails;
receive a second batch of the emails subsequent to the first batch;
formulate and display to the recipient a second listing of the second batch responsively to the correspondence.

12. An apparatus for processing electronic mail messages (emails), comprising:
a display which is configured to present a first listing of a first batch comprising three or more of the emails to a recipient of the emails for selection by the recipient for viewing; and
a processing unit, which is configured to:
receive the first batch of the three or more emails,
formulate a correspondence between a respective characterizing parameter of the three or more emails and respective different numbers indicative of an order of the selection by the recipient of the three or more emails;
receive a second batch of the emails subsequent to the first batch, and
formulate and present on the display to the recipient a second listing of the second batch responsively to the correspondence.

13. The apparatus according to claim 12, wherein the respective characterizing parameter comprises a respective sender of the three or more emails.

14. The apparatus according to claim 12, wherein the respective characterizing parameter is selected from a group of characterizing parameters comprising timestamps, attachments, priorities, subjects, sizes, accounts, and contents of the emails.

15. The apparatus according to claim 12, wherein the first batch of the three or more emails comprises an initial batch of the three or more emails, and wherein displaying the first listing comprises displaying the initial batch in a chronological order.

16. The apparatus according to claim 12, wherein the processing unit is configured to:
receive respective subsequent batches of the emails after the second batch;
record subsequent orders of selection by the recipient of the emails from the second batch and from the respective subsequent batches; and
formulate and present on the display to the recipient respective listings of the respective subsequent batches responsively to the subsequent orders of selection.

17. The apparatus according to claim 16, wherein recording the subsequent orders of selection comprises:
recording respective co-occurrences of first emails having a first characterizing parameter and second emails having a second characterizing parameter in the first batch, the second batch and the subsequent batches of the emails; and
recording a number of times the first emails are selected for viewing before the second emails are selected for viewing.

18. The apparatus according to claim 17, wherein the first characterizing parameter comprises a first sender of the first emails and wherein the second characterizing parameter comprises a second sender of the second emails.

19. The apparatus according to claim 17, wherein the processing unit is configured to generate a first order metric for the first characterizing parameter and a second order metric for the second characterizing parameter in response to the respective co-occurrences and the number of times, and wherein presenting on the display the respective listings comprises displaying emails of the respective listings responsively to the first and the second order metrics.

20. The apparatus according to claim 19, wherein generating the first order metric comprises generating the first order metric in response to an action of the recipient comprising at least one of ignoring at least one of the first emails and deleting at least one of the first emails.

21. The apparatus according to claim 19, wherein generating the first order metric comprises determining, from the first batch, the second batch, and the subsequent batches, a number of batches having the first emails absent and applying a decay factor to the first order metric in response to the number of batches.

* * * * *